United States Patent
Yoo et al.

(10) Patent No.: US 8,335,395 B2
(45) Date of Patent: Dec. 18, 2012

(54) NOISE REDUCTION APPARATUS HAVING EDGE ENHANCEMENT FUNCTION AND METHOD THEREOF

(75) Inventors: Young-jin Yoo, Guri-si (KR); Won-hee Choe, Gyeongju-si (KR); Jae-guyn Lim, Yongin-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1469 days.

(21) Appl. No.: 11/907,293

(22) Filed: Oct. 10, 2007

(65) Prior Publication Data

US 2008/0298713 A1    Dec. 4, 2008

(30) Foreign Application Priority Data

May 30, 2007  (KR) .......................... 10-2007-0052835

(51) Int. Cl.
*G06K 9/40*    (2006.01)

(52) U.S. Cl. ........ 382/266; 382/274; 382/275; 382/282; 358/3.26; 358/3.27; 358/463

(58) Field of Classification Search .................. 382/260, 382/266, 274, 275, 282; 358/3.26, 3.27, 358/463
See application file for complete search history.

(56) References Cited

U.S. PATENT DOCUMENTS

| | | | | |
|---|---|---|---|---|
| 6,611,296 B1 * | 8/2003 | Nieuwenhuizen et al. | ... | 348/625 |
| 6,628,842 B1 * | 9/2003 | Nagao | ............................ | 382/266 |
| 6,667,815 B1 * | 12/2003 | Nagao | ............................ | 358/1.9 |
| 7,149,355 B2 * | 12/2006 | Kubota | ......................... | 382/199 |
| 7,190,832 B2 * | 3/2007 | Frost et al. | ..................... | 382/173 |
| 7,274,828 B2 * | 9/2007 | Wang et al. | .................... | 382/266 |
| 7,336,848 B2 * | 2/2008 | Sartor et al. | .................. | 382/274 |
| 7,430,336 B2 * | 9/2008 | Raveendran | .................. | 382/268 |
| 7,433,535 B2 * | 10/2008 | Mukherjee | ..................... | 382/266 |
| 7,567,723 B2 * | 7/2009 | Sakakima | ..................... | 382/254 |
| 7,689,055 B2 * | 3/2010 | Zhang et al. | .................. | 382/254 |
| 7,769,244 B2 * | 8/2010 | Kozlov et al. | ................. | 382/275 |
| 7,801,335 B2 * | 9/2010 | Hanna et al. | .................. | 382/117 |
| 7,839,446 B2 * | 11/2010 | Hirano et al. | ............ | 348/333.09 |

FOREIGN PATENT DOCUMENTS

| | | |
|---|---|---|
| JP | 2005-303731 | 10/2005 |
| KR | 10-0168007 | 9/1998 |
| KR | 10-2003-0080120 | 10/2003 |
| KR | 10-2005-0102805 | 10/2005 |
| KR | 10-2006-0023007 | 3/2006 |
| KR | 10-2006-0098227 | 9/2006 |

OTHER PUBLICATIONS

Office Action dated Mar. 31, 2008 in Korean Patent Application No. 10-2007-0052835 (4 pages).

* cited by examiner

*Primary Examiner* — Yosef Kassa
(74) *Attorney, Agent, or Firm* — Staas & Halsey LLP

(57) ABSTRACT

Provided are a noise reduction apparatus having an edge enhancement function and a method thereof, in which edges in an input image can be prevented from being blurred when reducing noise in the input image and a clear output image can be obtained by reducing edge discontinuities. The noise reduction apparatus includes a window setting module which sets a portion of an input image as a window, an edge-information detection module which detects edge information regarding the window, an image processing module which performs an image processing operation on the window, and an output-image generation module which generates an output image by reflecting the edge information into one or more windows obtained by the image processing operation.

14 Claims, 8 Drawing Sheets

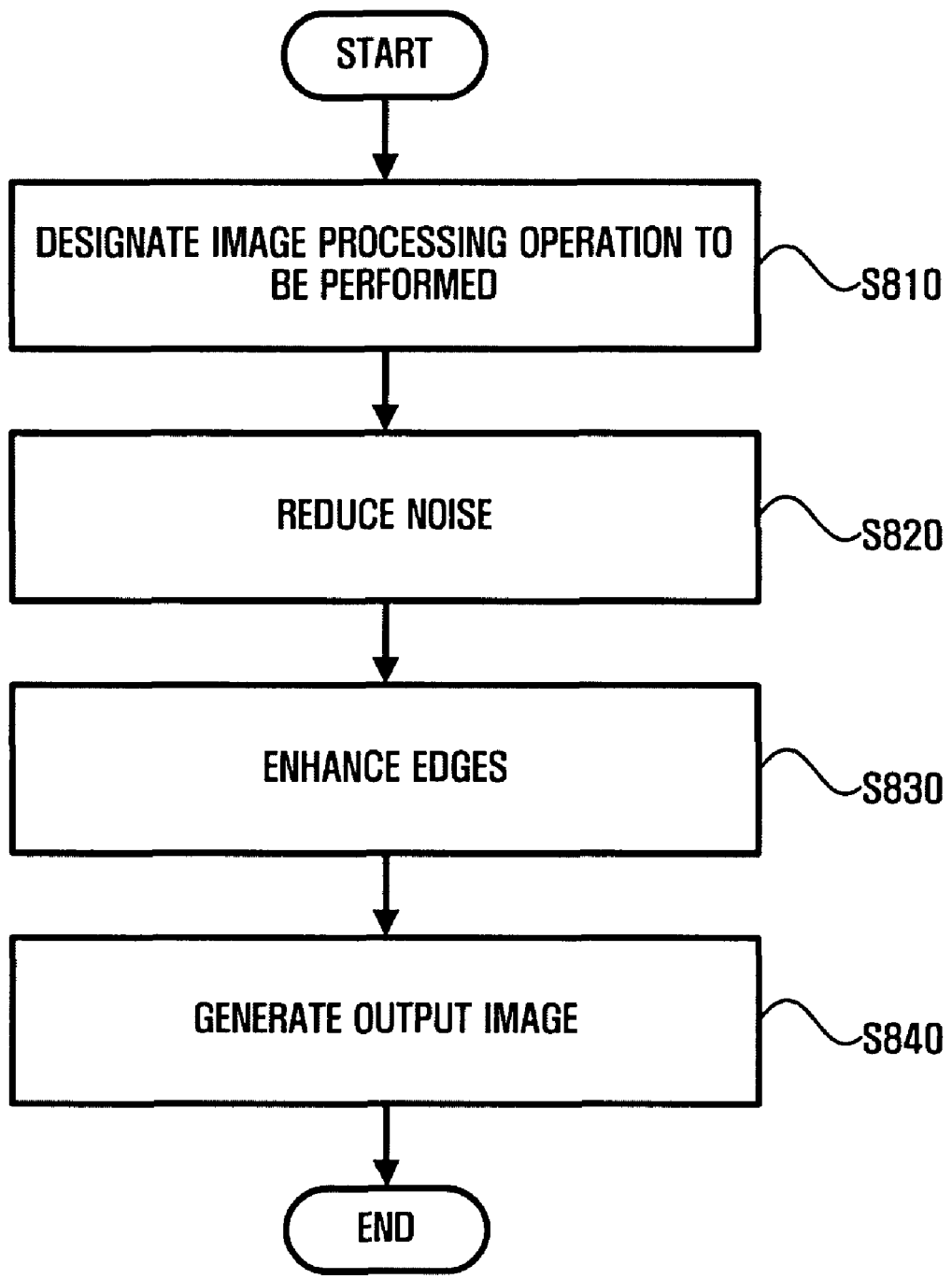

NOISE REDUCTION APPARATUS HAVING EDGE ENHANCEMENT FUNCTION AND METHOD THEREOF

CROSS-REFERENCE TO RELATED APPLICATION

This application claims priority from Korean Patent Application No. 10-2007-0052835 filed on May 30, 2007 in the Korean Intellectual Property Office, the disclosure of which is incorporated herein by reference in its entirety.

BACKGROUND OF THE INVENTION

1. Field of the Invention

The present invention relates to a noise reduction apparatus having an edge enhancement function and a method thereof, and more particularly, to a noise reduction apparatus having an edge enhancement function and a method thereof, in which edges in an input image can be prevented from being blurred when reducing noise in the input image and a clear output image can be obtained by reducing edge discontinuities.

2. Description of the Related Art

Conventional noise reduction methods generally have low-pass filtering characteristics and are likely to damage original image data. In order to address this problem, methods have been suggested in which only portions of an original image which do not have any edges are processed while leaving other portions having edges unprocessed. However, there is a drawback in that these methods do not correct edge defects such as edge discontinuities.

Therefore, a noise reduction technique, which is capable of generating a clear image by reducing edge discontinuities that may result from noise reduction, is needed.

SUMMARY OF THE INVENTION

Aspects of the present invention provide a noise reduction apparatus having an edge enhancement function and a method thereof, in which edges in an input image can be prevented from being blurred when reducing noise in the input image and a clear output image can be obtained by reducing edge discontinuities.

However, the aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided a noise reduction apparatus having an edge enhancement function. The noise reduction apparatus includes: a window setting module which sets a portion of an input image as a window; an edge-information detection module which detects edge information regarding the window; an image processing module which performs an image processing operation on the window; and an output-image generation module which generates an output image by reflecting the edge information into one or more windows obtained by the image processing operation.

According to another aspect of the present invention, there is provided a noise reduction apparatus having an edge enhancement function. The noise reduction apparatus includes: a window setting module which sets a portion of an input image as a window; an edge-information detection module which detects edge information regarding the window; and an image processing module which performs an image processing operation on the window and generates an output image by reflecting the edge information into one or more windows obtained by the image processing operation.

According to another aspect of the present invention, there is provided a noise reduction method having an edge enhancement function. The noise reduction method includes: setting a portion of an input image as a window; detecting edge information regarding the window; performing an image processing operation on the window; and generating an output image by reflecting the edge information into one or more windows obtained by the image processing operation.

According to another aspect of the present invention, there is provided a noise reduction method having an edge enhancement function. The noise reduction method includes: setting a portion of an input image as a window; detecting edge information regarding the window; and performing an image processing operation on the window and generates an output image by reflecting the edge information into one or more windows obtained by the image processing operation.

BRIEF DESCRIPTION OF THE DRAWINGS

The above and other aspects and features of the present invention will become more apparent by describing in detail exemplary embodiments thereof with reference to the attached drawings, in which:

FIG. 8 is a detailed flowchart illustrating the processing of an image as performed in the method illustrated in FIG. 8.

DETAILED DESCRIPTION OF THE EXEMPLARY EMBODIMENTS

Figure 1:
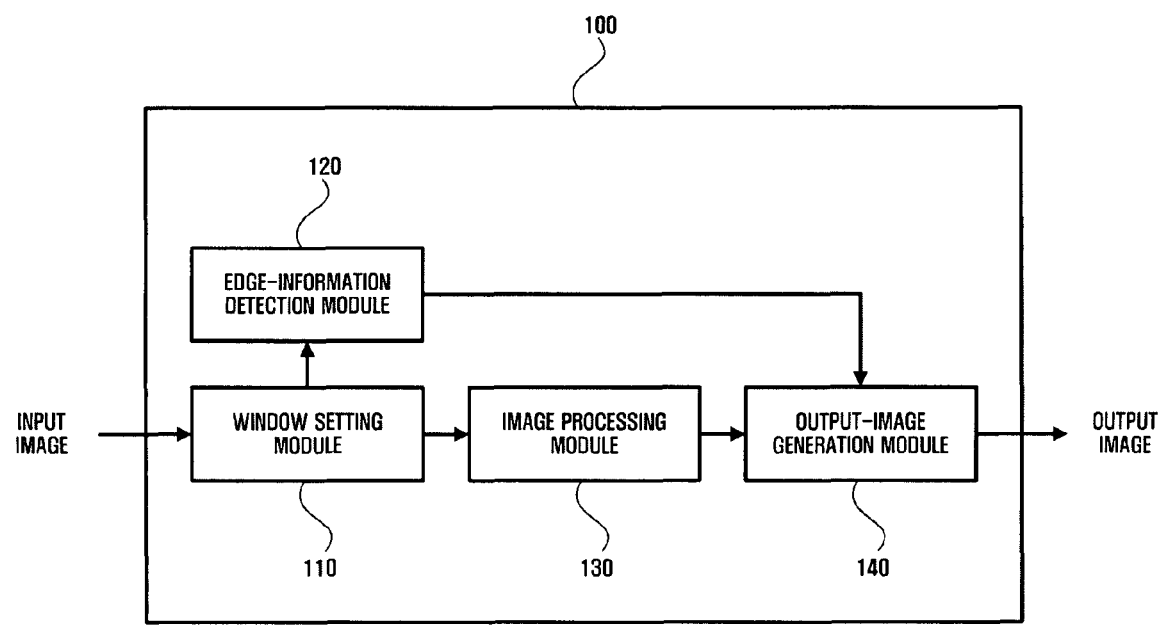
FIG. 1 is a block diagram of a noise reduction apparatus having an edge enhancement function, according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements.

Hereinafter, exemplary embodiments of the present invention will be described in detail with reference to the drawings.

FIG. 1 is a block diagram of a noise reduction apparatus 100 with an edge enhancement function, according to an embodiment of the present invention. Referring to FIG. 1, the noise reduction apparatus 100 includes a window setting module 110, an edge-information detection module 120, an image processing module 130, and an output-image generation module 140. The noise reduction apparatus 100 may be applied to an image capturing device such as a digital camcorder.

The window setting module 110 sets a portion of an input image as a window. A window may include a center pixel which corresponds to the center of the window and a number of peripheral circuits.

The edge-information detection module 120 detects edge information regarding edges that may be included in a window. The edge information may include at least one of maximum gradient information, signal-to-noise ratio (SNR) information, and standard deviation information, but the present invention is not restricted thereto.

The image processing module 130 performs an image processing operation on a window. The image processing module 130 may include a noise reducer (not shown) and an edge enhancer (not shown).

The noise reducer of the image processing module 130 receives a window, calculates a noise level of the received window, determines a weight for the received window according to the result of the calculation, and reduces noise in the received window using the weight. The calculation of a noise level of a window may be performed with reference to auto-exposure information, but the present invention is not restricted thereto.

The edge enhancer of the image processing module 130 receives a window, calculates a luminance difference in the received window, determines a weight for the received window according to the result of the calculation, and generates a luminance difference convolution mask using the weight.

Thereafter, the edge enhancer receives another window, calculates a chromaticity difference in the received window, determines a weight for the received window according to the result of the calculation, and generates a chromaticity difference convolution mask using the weight.

Thereafter, the edge enhancer generates an edge enhancement convolution mask by multiplying the luminance difference convolution mask and the chromaticity difference convolution mask. Then, the edge enhancer performs an edge enhancement operation by convoluting a window with the edge enhancement convolution mask.

The luminance difference in a window may be an average of the differences between the luminance of a center pixel of the window and the lumiannces of a number of peripheral pixels of the window.

The chromaticity difference in a window may be the difference between maximum and minimum luminance differences detected from the window, but the present invention is not restricted to this.

The output-image generation module 140 receives a noise-reduced window and an edge-enhanced window from the image processing module 130, receives edge information from the edge-information detection module 120, and generates an output image using the received windows and the edge information.

Figure 2A:
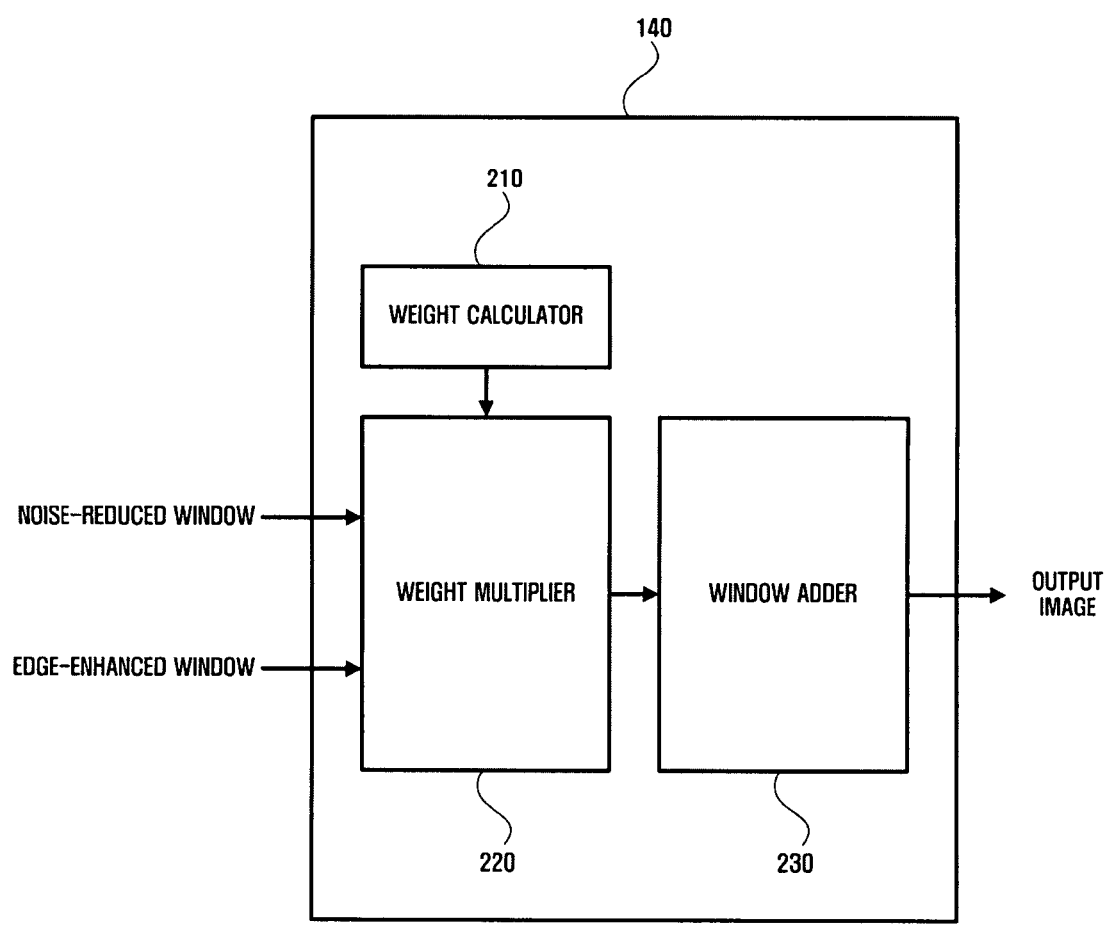
FIG. 2A is a detailed block diagram of an output-image generation module illustrated in FIG. 1.

FIG. 2A is a detailed block diagram of the output-image generation module 140 illustrated in FIG. 1. Referring to FIG. 2A, the output-image generation module 140 includes a weight calculator 210, a weight multiplier 220, and a window adder 230.

The weight calculator 210 receives edge information, and calculates a weight according to the edge information. More specifically, the weight calculator 210 may calculate at least one of a weight for a noise-reduced window and a weight for an edge-enhanced window, where the sum of the weight for a noise-reduced window and the weight for an edge-enhanced window may be 1.

The weight multiplier 220 receives a weight from the weight calculator 210, receives a noise-reduced window and an edge-enhanced window, and multiplies the received windows by the received weight.

The window adder 230 receives a noise-reduced window and an edge-enhanced window, which are both obtained by the multiplication performed by the weight multiplier 220, and adds the received windows.

Figure 2B:
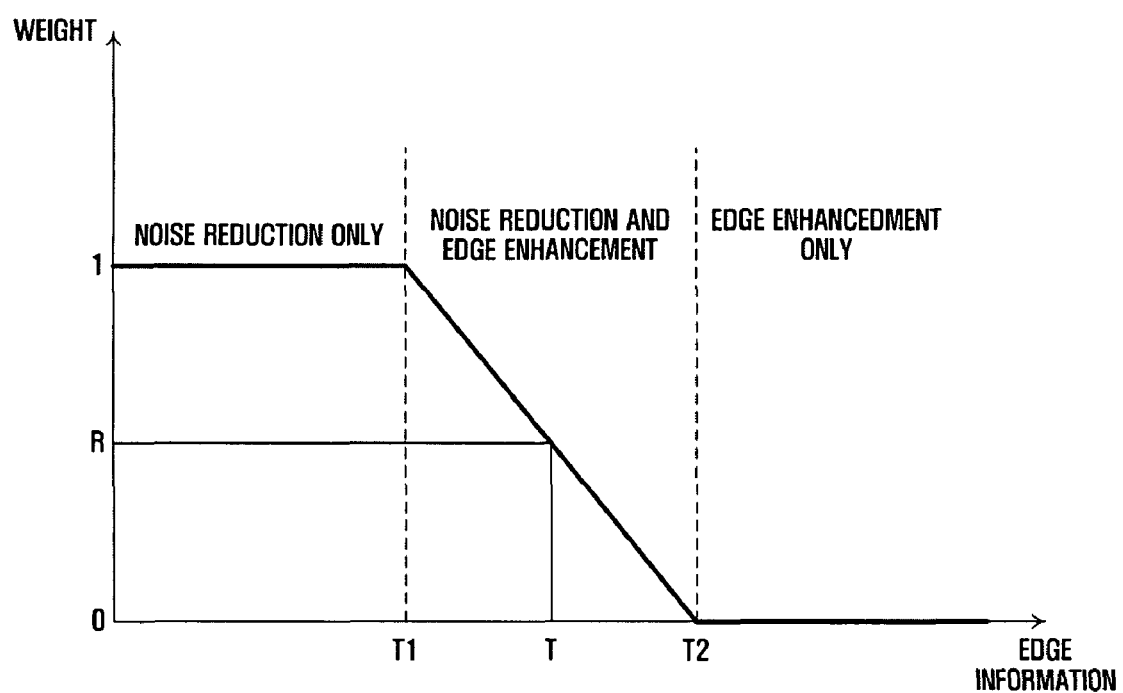
FIG. 2B is a graph illustrating a weight curve that represents weight variations with respect to edge information and that can be applied to a weight calculator illustrated in FIG. 2A.

FIG. 2B is a graph illustrating a weight curve that represents weight variations with respect to edge information and that can be applied to the weight calculator 210 illustrated in FIG. 2A. Referring to FIG. 2B, if the weight applied to a noise-reduced window is R, the weight to an edge-enhanced window may be (1−R). Also, the weight curve is divided into three sections: a section only for noise reduction, a section for both noise reduction and edge enhancement, and a section only for edge enhancement. Coefficients T1 and T2 that divide the weight curve into the three sections may be determined by a user. The weight curve may be a monotonously decreasing curve, but the present invention is not restricted to this.

Figure 3:
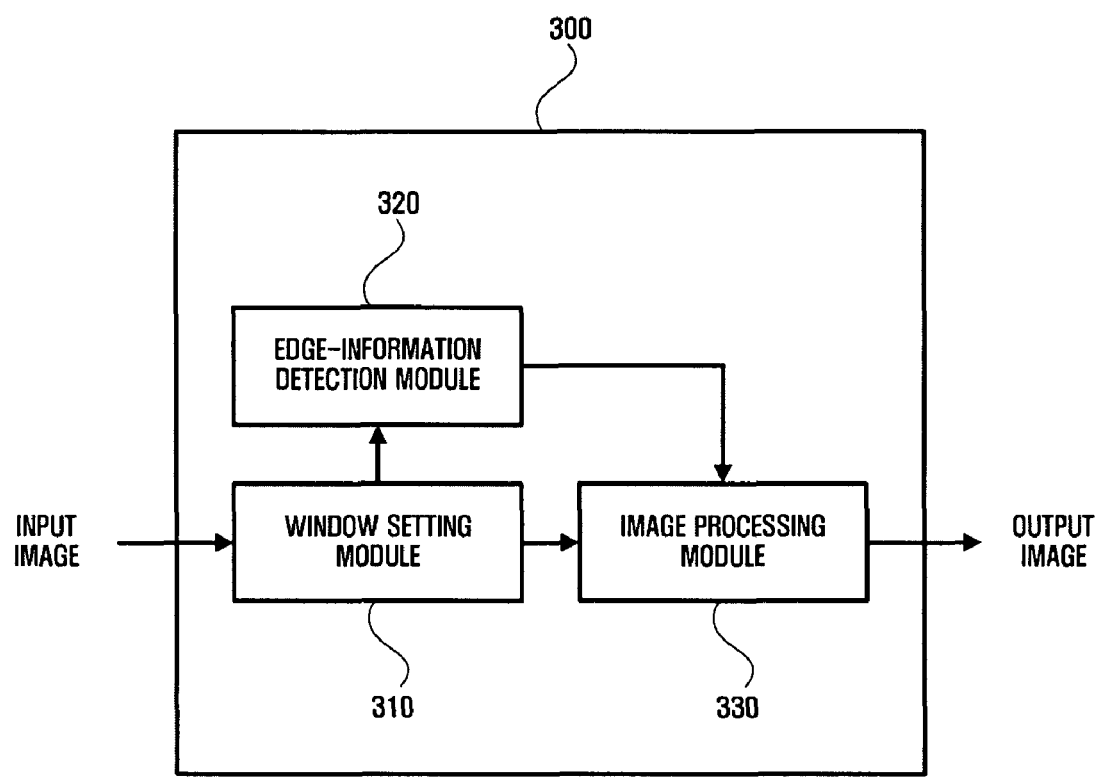
FIG. 3 is a block diagram of a noise reduction apparatus having an edge enhancement function, according to another embodiment of the present invention.

FIG. 3 is a block diagram of a noise reduction apparatus 300 with an edge enhancement function, according to another embodiment of the present invention. Referring to FIG. 3, the noise reduction apparatus 300 includes a window setting module 310, an edge-information detection module 320, and an image processing module 330.

The window setting module 310 sets a portion of an input image as a window. A window may include a center pixel which corresponds to the center of the window and a number of peripheral circuits.

The edge-information detection module 320 detects edge information regarding edges that may be included in a window. The edge information may include at least one of maximum gradient information, SNR information, and standard deviation information, but the present invention is not restricted thereto.

The image processing module 330 receives a window from the window setting module 310, receives edge information from the edge-information detection module 32 and performs an image processing operation on the received window according to the received edge information.

Figure 4:
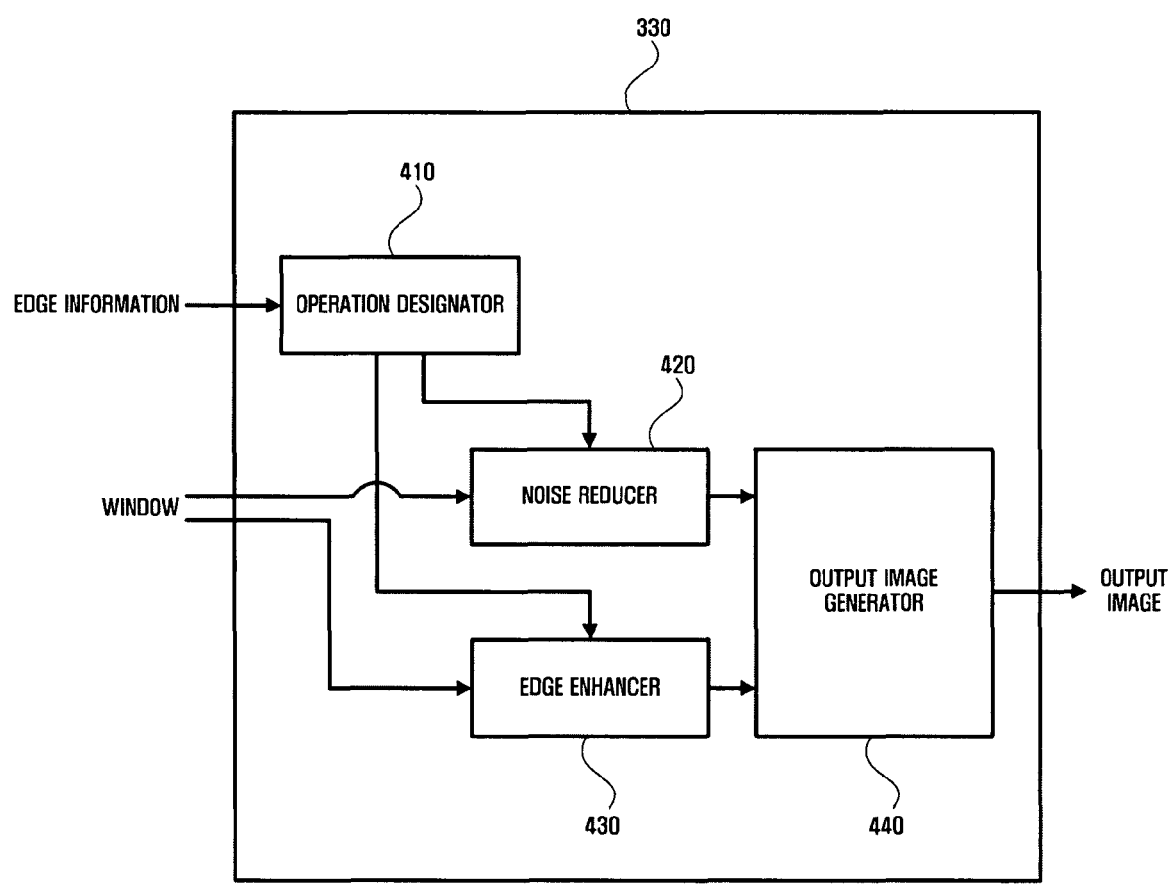
FIG. 4 is a detailed block diagram of an image processing module illustrated in FIG. 3.

FIG. 4 is a detailed block diagram of the image processing module 330 illustrated in FIG. 3. Referring to FIG. 4, the image processing module 330 includes an operation designator 410, a noise reducer 420, an edge enhancer 430, and an output image generator 440.

The operation designator 410 receives edge information and generates one or more selection signals based on the received edge information.

The selection signals may include at least one of a noise reduction selection signal and an edge enhancement selection signal. The noise reduction selection signal is output to the noise reducer 420, and the edge enhancement selection signal is output to the edge enhancer 430.

The noise reducer 420 receives the noise reduction selection signal from the operation designator 410, receives a window from the window setting module 310, and reduces noise in the received window by reflecting the noise reduction selection signal into the received window.

The noise reducer 420 may adjust the degree to which noise in a window is to be reduced according to the noise reduction selection signal.

The edge enhancer 430 receives the edge enhancement selection signal from the operation designator 410, receives a window from the window setting module 310, and enhances edges in the received window by reflecting the edge enhancement selection signal into the received window.

The edge enhancer 430 may adjust the degree to which edges in a window are to be enhanced according to the noise reduction selection signal.

The output image generator 440 receives a noise-reduced window from the noise reducer 420, an edge-enhanced window from the edge enhancer 430, and generates an output image based on the noise-reduced window and the edge-enhanced window.

More specifically, the output image generator 440 may generate an output image by adding up a noise-reduced window and an edge-enhanced window.

Figure 5:
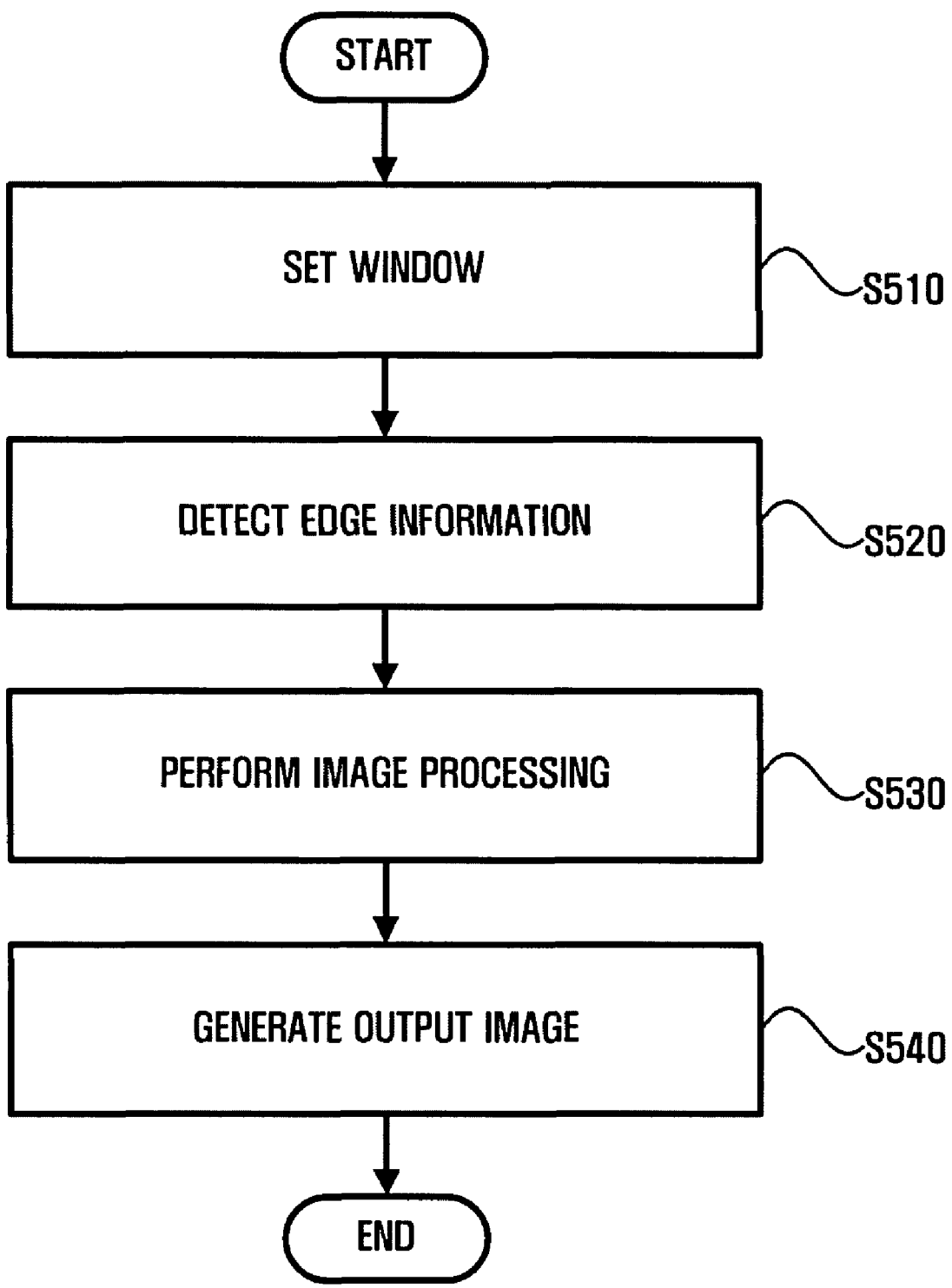
FIG. 5 is a flowchart illustrating a noise reduction method having an edge improvement function, according to an embodiment of the present invention.

FIG. 5 is a flowchart illustrating a noise reduction method with an edge enhancement function, according to an embodiment of the present invention. Referring to FIG. 5, in order to reduce noise in an input image and enhance edges in the input image, the window setting module 110 of the noise reduction apparatus 100 sets a portion of the input image as a window (S510).

The window is transmitted to the edge-information detection module 120, and the edge-information detection module 120 detects edge information by analyzing a number of pixels included in the window (S520). The edge information may include at least one of maximum gradient information, SNR information, and standard deviation information.

The edge information is transmitted to the image processing module 130, and the image processing module 130 performs an image processing operation on the window for both noise reduction and edge enhancement (S530). More specifically, the image processing module 130 performs a noise reduction operation on the window by applying a weight for noise reduction to the window. The weight for noise reduction is determined according to a noise level of the window.

Also, the image processing module 130 determines a luminance difference-based weight and a chromaticity difference-based weight based on the window, generates a luminance difference convolution mask and a chromaticity difference convolution mask based on the luminance difference-based weight and the chromaticity difference-based weight, and performs an edge enhancement operation on the window by applying an edge enhancement convolution mask to the window. The edge enhancement convolution mask is obtained by multiplying the luminance difference convolution mask and the chromaticity difference convolution mask.

A noise-reduced window obtained by the noise reduction operation and an edge-enhanced window obtained by the edge enhancement operation are transmitted to the output-image generation module 140, and the output-image generation module 140 generates an output image with the edge information reflected thereinto (S540).

Figure 6:
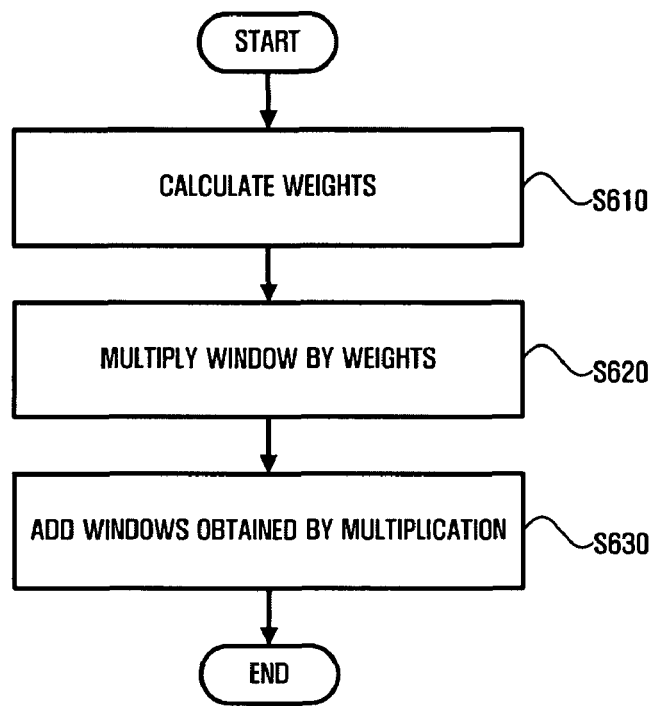
FIG. 6 is a detailed flowchart illustrating the generation of an output image as performed in the method illustrated in FIG. 5.

FIG. 6 is a detailed flowchart illustrating the generation of an output image as performed in the method illustrated in FIG. 5. Referring to FIG. 6, the weight calculator 210 of the output-image generation module 140 calculates one or more weights, i.e., a weight for a noise-reduced window and a weight for an edge-enhanced window (S610).

The weight multiplier 220 applies the weights obtained in operation S610 to a window (S620). That is, the weight multiplier 220 generates a number of windows by multiplying a window by the weights obtained in operation S610 (S620).

The window adder 230 adds the windows obtained in operation S620, thereby generating an output image (S630).

Figure 7:
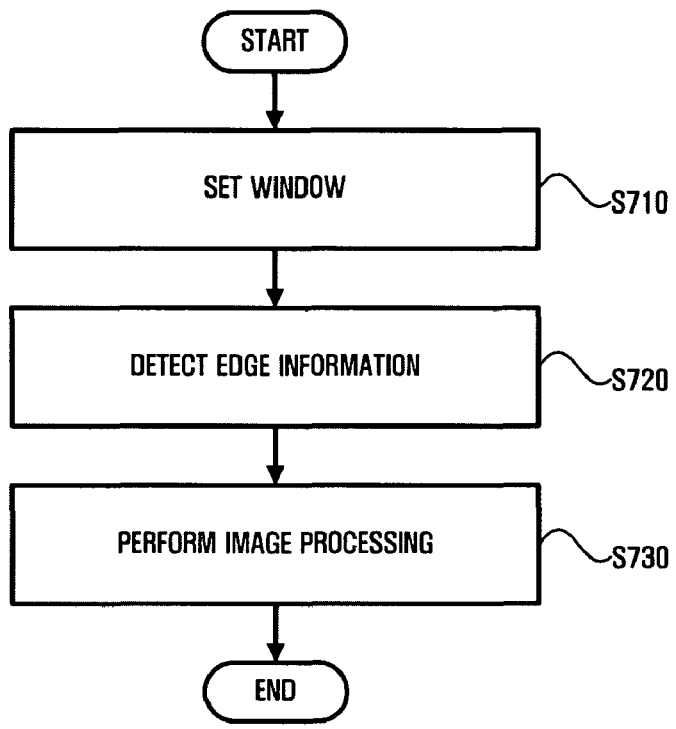
FIG. 7 is a flowchart illustrating a noise reduction method having an edge improvement function, according to another embodiment of the present invention.

FIG. 7 is a flowchart illustrating a noise reduction method having an edge enhancement function, according to another embodiment of the present invention. Referring to FIG. 7, in order to reduce noise in an input image and enhance edges in the input image, the window setting module 310 of the noise reduction apparatus 300 sets a portion of the input image as a window (S710).

The window is transmitted to the edge-information detection module 320, and the edge-information detection module 320 detects edge information by analyzing a number of pixels included in the window (S720).

The edge information is transmitted to the image processing module 330, and the image processing module 330 performs an image processing operation on the window for both noise reduction and edge enhancement (S730).

FIG. 8 is a detailed flowchart illustrating the generation of an output image as performed in the method illustrated in FIG. 7. Referring to FIG. 8, the operation designator 410 of the image processing module 330 receives edge information and generates one or more selection signals based on the edge information (S810). The selection signals may include at least one of a noise reduction selection signal and an edge enhancement selection signal.

The noise reduction selection signal and a window are transmitted to the noise reducer 420, and the noise reducer 420 performs a noise reduction operation on the window (S820).

The edge enhancement selection signal and the window are transmitted to the edge enhancer 430, and the edge enhancer 430 performs an edge enhancement operation on the window (S830).

The noise reduction operation and the edge enhancement operation may be performed at the same time, or may be performed in the reverse order to that set forth herein.

The output image generator 440 receives a noise-reduced window from the noise reducer 420, receives an edge-enhanced window from the edge enhancer 430, and generates an output image by adding up the noise-reduced window and the edge-enhanced window (S840).

The term "module" as used herein means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, according to the present invention, edges in an input image can be prevented from being blurred when reducing noise in the input image. In addition, a clear image can be obtained by reducing edge discontinuities.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A noise reduction apparatus having an edge enhancement function, the noise reduction apparatus comprising:
   a window setting module which sets a portion of an input image as a window, the window comprising a center pixel and one or more peripheral pixels;
   an edge-information detection module which detects edge information regarding the window;
   an image processing module which performs an image processing operation on the window; and
   an output-image generation module which generates an output image by reflecting, according to a calculated weight for the edge information, the edge information into one or more windows obtained by the image processing operation.

2. The noise reduction apparatus of claim 1, wherein the edge information comprises at least one of maximum gradient information, signal-to-noise (SNR) information and standard deviation information.

3. The noise reduction apparatus of claim 1, wherein the image processing module comprises:
   a noise reducer which performs a noise reduction operation on the window according to a noise level of the window; and
   an edge enhancer which performs an edge enhancement operation on the window according to an edginess of the window.

4. The noise reduction apparatus of claim 3, wherein the output-image generation module comprises:
   a weight calculator which calculates a first weight for a noise-reduced window obtained by the noise reduction operation and a second weight for an edge-enhanced window obtained by the edge enhancement operation;
   a weight multiplier which multiplies the noise-reduced window by the first weight and multiplies the edge-enhanced window by the second weight; and
   a window adder which generates an output image by adding the noise-reduced window multiplied by the first weight and the edge-enhanced window multiplied by the second weight.

5. A noise reduction apparatus having an edge enhancement function, the noise reduction apparatus comprising:
   a window setting module which sets a portion of an input image as a window, the window comprising a center pixel and one or more peripheral pixels;
   an edge-information detection module which detects edge information regarding the window; and
   an image processing module which performs an image processing operation on the window and generates an output image by reflecting, according to a calculated weight for the edge information, the edge information into one or more windows obtained by the image processing operation.

6. The noise reduction apparatus of claim 5, wherein the edge information comprises at least one of maximum gradient information, SNR information and standard deviation information.

7. The noise reduction apparatus of claim 1, wherein the image processing module comprises:
   an operation designator which designates an image processing operation to be performed on the window based on the edge information;
   a noise reducer which performs a noise reduction operation on the window according to a noise level of the window;
   an edge enhancer which performs an edge enhancement operation on the window according to an edginess of the window; and
   an output image generator which generates an output image by adding a noise-reduced window obtained by the noise reduction operation and an edge-enhanced window obtained by the edge enhancement operation.

8. A noise reduction method having an edge enhancement function, the noise reduction method comprising:
   setting a portion of an input image as a window, the window comprising a center pixel and one or more peripheral pixels;
   detecting edge information regarding the window;
   performing an image processing operation on the window; and
   generating an output image by reflecting, according to a calculated weight for the edge information, the edge information into one or more windows obtained by the image processing operation.

9. The noise reduction method of claim 8, wherein the edge information comprises at least one of maximum gradient information, SNR information and standard deviation information.

10. The noise reduction method of claim 8, wherein the performing of the image processing operation comprises:
    performing a noise reduction operation on the window according to a noise level of the window; and
    performing an edge enhancement operation on the window according to edginess of the window.

11. The noise reduction method of claim 10, wherein the generating of the output image comprises:
    calculating a first weight for a noise-reduced window obtained by the noise reduction operation and a second weight for an edge-enhanced window obtained by the edge enhancement operation;
    multiplying the noise-reduced window by the first weight and multiplying the edge-enhanced window by the second weight; and
    generating an output image by adding the noise-reduced window multiplied by the first weight and the edge-enhanced window multiplied by the second weight.

12. A noise reduction method having an edge enhancement function, the noise reduction method comprising:
    setting a portion of an input image as a window, the window comprising a center pixel and one or more peripheral pixels;
    detecting edge information regarding the window; and
    performing an image processing operation on the window and generates an output image by reflecting, according to a calculated weight for the edge information, the edge information into one or more windows obtained by the image processing operation.

13. The noise reduction method of claim 12, wherein the edge information comprises at least one of maximum gradient information, SNR information and standard deviation information.

14. The noise reduction method of claim 12, wherein the generating of the output image comprises:
    designating an image processing operation to be performed on the window based on the edge information;
    performing a noise reduction operation on the window according to a noise level of the window;
    performing an edge enhancement operation on the window according to edginess of the window; and
    generating an output image by adding up a noise-reduced window obtained by the noise reduction operation and an edge-enhanced window obtained by the edge enhancement operation.

* * * * *